US010482545B2

(12) United States Patent
Anderson et al.

(10) Patent No.: US 10,482,545 B2
(45) Date of Patent: Nov. 19, 2019

(54) USER MANAGEMENT OF SUBSCRIPTIONS TO MULTIPLE SOCIAL NETWORK PLATFORMS

(71) Applicants: Katherine Elizabeth Anderson, Dallas, TX (US); Michael Wayne Gilley, Dallas, TX (US); Patrick Joel Hurley, Dallas, TX (US)

(72) Inventors: Katherine Elizabeth Anderson, Dallas, TX (US); Michael Wayne Gilley, Dallas, TX (US); Patrick Joel Hurley, Dallas, TX (US)

(*) Notice: Subject to any disclaimer, the term of this patent is extended or adjusted under 35 U.S.C. 154(b) by 116 days.

(21) Appl. No.: 14/588,894

(22) Filed: Jan. 2, 2015

(65) Prior Publication Data

US 2015/0186025 A1    Jul. 2, 2015

Related U.S. Application Data

(60) Provisional application No. 61/923,107, filed on Jan. 2, 2014.

(51) Int. Cl.
*G06Q 50/00* (2012.01)
*G06Q 10/10* (2012.01)

(52) U.S. Cl.
CPC .................. *G06Q 50/01* (2013.01)

(58) Field of Classification Search
CPC ................ G06Q 50/01; G06Q 10/101
See application file for complete search history.

(56) References Cited

U.S. PATENT DOCUMENTS

| 8,200,775 B2 | 7/2012 | Moore | |
| 8,549,047 B2 | 10/2013 | Beechuk | |
| 8,655,842 B2 * | 2/2014 | Xu | G06Q 50/01 |
| | | | 707/628 |
| 8,918,517 B2 | 12/2014 | Meijer | |
| 2004/0068481 A1 * | 4/2004 | Seshadri | G06Q 30/02 |
| 2010/0287256 A1 | 11/2010 | Neilio | |
| 2011/0047479 A1 * | 2/2011 | Ghosh | G06Q 10/109 |
| | | | 715/747 |
| 2012/0023201 A1 * | 1/2012 | Gideon | H04N 21/25883 |
| | | | 709/219 |
| 2012/0072494 A1 * | 3/2012 | Wong | G06F 17/3089 |
| | | | 709/204 |
| 2012/0079568 A1 | 3/2012 | Whitmyer | |
| 2012/0084841 A1 | 4/2012 | Whitmyer | |
| 2012/0197995 A1 | 8/2012 | Caruso | |
| 2012/0331053 A1 | 12/2012 | Dunn | |
| 2014/0025692 A1 | 1/2014 | Pappas | |
| 2014/0280134 A1 | 9/2014 | Horen | |
| 2014/0337436 A1 | 11/2014 | Hoagland | |
| 2015/0074191 A1 * | 3/2015 | Feng | H04L 67/26 |
| | | | 709/204 |
| 2015/0186945 A1 * | 7/2015 | Samuel | G06Q 30/0246 |
| | | | 705/14.25 |

OTHER PUBLICATIONS

Jinan Fiaidhi, et al., Identifying Middlewares for Mashup Personal Learning Environments, Future Internet 2009, 14 pages.

* cited by examiner

*Primary Examiner* — Andrea N Long
(74) *Attorney, Agent, or Firm* — Peter V. Schroeder

(57) ABSTRACT

Computerized systems are presented for user-management of social networking feeds, programs, and platforms. The methods, apparatus, systems, and programs allow a consumer, or end-user, to manage their computerized Social Network Subscriptions on their selected social networking platforms.

13 Claims, 7 Drawing Sheets

USER MANAGEMENT OF SUBSCRIPTIONS TO MULTIPLE SOCIAL NETWORK PLATFORMS

FIELD OF INVENTION

The present invention is in the technical field of computer applications for managing subscriptions and content feeds from multiple social network platforms.

BACKGROUND

With the proliferation of social media networking platforms, feeds, and subscriptions, as well as the increased usage of social media networking by news organizations, blogs, commercial companies, personal interest groups, and the entertainment industry to disseminate information such as advertising, announcements, sales, etc., consumers face the issue of dealing with the "noise" of large volumes of content delivered automatically from various content producers, on various social media platforms, and to the various consumer devices on which data is received. Some of this content the consumer wants to receive, and some they really do not. A need exists for methods and apparatus available to consumers, users, or end-users, enabling them to easily manage (cut down the "noise") the content they receive, across the various platforms to which they subscribe, and on the various devices they use.

Producers spend tremendous capital to create and distribute content to targeted and loyal consumers, often across multiple platforms (including email). However, much of this content never reaches the targeted consumers or gets "lost in the noise" with which consumers must manage. A need exists for methods and apparatus available to producers to efficiently distribute their desired content to reach targeted consumers.

BRIEF DESCRIPTION OF THE DRAWING

The present disclosures are described by reference to drawings showing one or more examples of how the disclosures can be made and used. In these drawing, reference characters are used throughout the several views to indicate like or corresponding parts. In the description which follows, like or corresponding parts are marked throughout the specification and drawing with the same reference numerals, respectively. The drawing does not purport to be to scale and proportions of certain parts have been exaggerated to better illustrate details and features.

DETAILED DESCRIPTION OF SOME EMBODIMENTS

Figure 1:
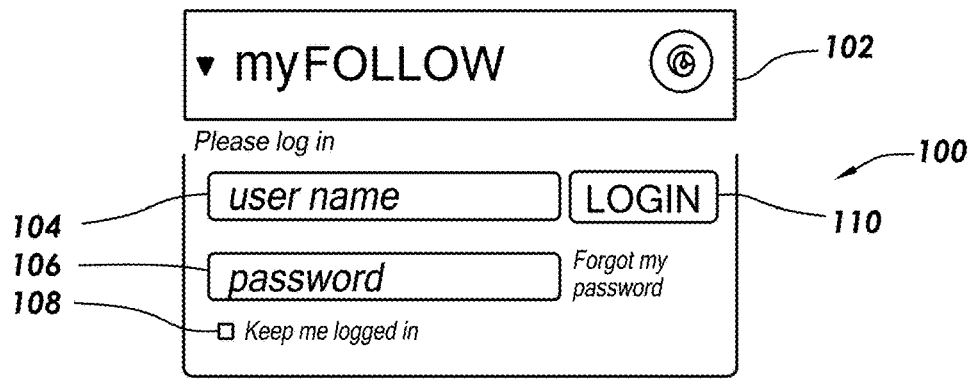
FIG. 1 is an exemplary UI display, generally designated 100, for logging on to a program according to an embodiment of the disclosure.

For a more complete understanding of the features and advantages of the present invention, reference is now made to the detailed description of the invention along with the accompanying figures in which corresponding numerals in the different figures refer to corresponding parts.

The disclosed methods and apparatus are for use with social media networking feeds, programs, and platforms. The disclosed methods, apparatus, systems, and programs allow a consumer, or end-user, to manage their computerized Social Network Subscriptions on their selected social networking platforms. Social Networking Platforms, as used herein, include websites, software programs, applications, systems, and services providing social networking functions and capabilities. Social Network Platforms publish or allow a user to publish, Social Network Streams, as used herein, including micro-blog streams (via platforms such as, e.g., Twitter (trade name), Ping (trade name)), social network streams (via platforms such as, e.g., Facebook (trade name), MySpace (trade name), LinkedIn (trade name)), photo sharing streams (via platforms such as, e.g., Flickr (trade name), Picasa (trade name), Shutterfly (trade name)), rich site summary (RSS) feeds (e.g., blogs, traffic data, news, weather data, home systems monitoring, market data), other file-sharing streams (via platforms such as, e.g., Pownce (trade name), BitTorrent (trade name)), transformed output streams, global positioning system (GPS) data, consumer financial data (e.g., credit card data, delivery address, etc.), coupons, and other Web2 streams, that transmit via the Internet (via platforms such as, e.g., life-streaming services, Socialthing (trade name)), as well as short messaging service (SMS) message streams, multimedia messaging service (MMS) message streams, instant messaging (IM) streams, and email.

Social Media Content is created and distributed by Producers, which can be retail or wholesale companies, e-commerce organizations, brands, musical and audiovisual artists and groups, other end-users or consumers, educational organizations, business or religious organizations, and any entity producing social media Content. The Content is then streamed to selected consumers, typically those having an account with the Producer or who have indicated via a social network platform that they wish to receive Content from that Producer. The Content can be pushed to or pulled from the user's computer device depending on the mechanism employed by the Producer, the platform, and/or the device.

As used herein, any person who consumes Content for personal, business, or other use is referred to as a consumer, user, end-user, or the like. Consumption by the consumer occurs via viewing a screen component in communication with or part of a computer device. A computer device includes desktop and laptop computers, e-pads and tablets, mobile computer devices, smart phones, smart televisions, computerized media management devices, etc. For purposes of this disclosure, the computer device connects to the internet.

Content includes, but is not limited to, images, text, video, audio, audiovisual data, and metadata. To receive Content, a consumer subscribes to a Producer. A consumer can subscribe directly to a Producer, such as by opening an on-line account with a retail store, or can subscribe to a Producer using a social networking platform (e.g., Twitter (trade name)), such as by "liking," or "following" the retail store. Subscribing, as used herein, includes following, subscribing, liking, connecting, opting-in, or otherwise indicating a desire to receive Content from one or more Producers via the internet, email, etc.

The Consumer can utilize the disclosed methods and apparatus on a computer device connected to the internet. A computer program can be downloaded or otherwise loaded onto the consumer's computer device or devices. For example, such a program downloaded onto a mobile phone is commonly called an "app." The program allows the consumer to view a program link, such as a widget or icon, open and interface with the program. As is known in the art, the local program or app communicates via the internet with one or more backend servers. The backend servers typically perform the actions or tasks indicated, store the consumer's data, preferences, etc., on networked databases, etc., although in some embodiments some actions are performed directly by the user's device.

FIG. 1 is an exemplary UI display, generally designated 100, for logging on to a program according to an embodiment of the disclosure. A consumer, upon opening the program, is provided with a "log on" display 102, typically requiring entry of identification and security data, such as a user name 104 and password 106. Although not shown in detail, the disclosed methods and apparatus preferably employ security and identification programs, such as are known in the art, to allow access, data entry, and changes to user accounts. Other possible features for the log-in screen include an indication to maintain the user logged-in 108, to remember the user name or password, and a log-on button 110 or similar. Additional log-on screen features are known in the art and can be provided as desired.

Figure 2:
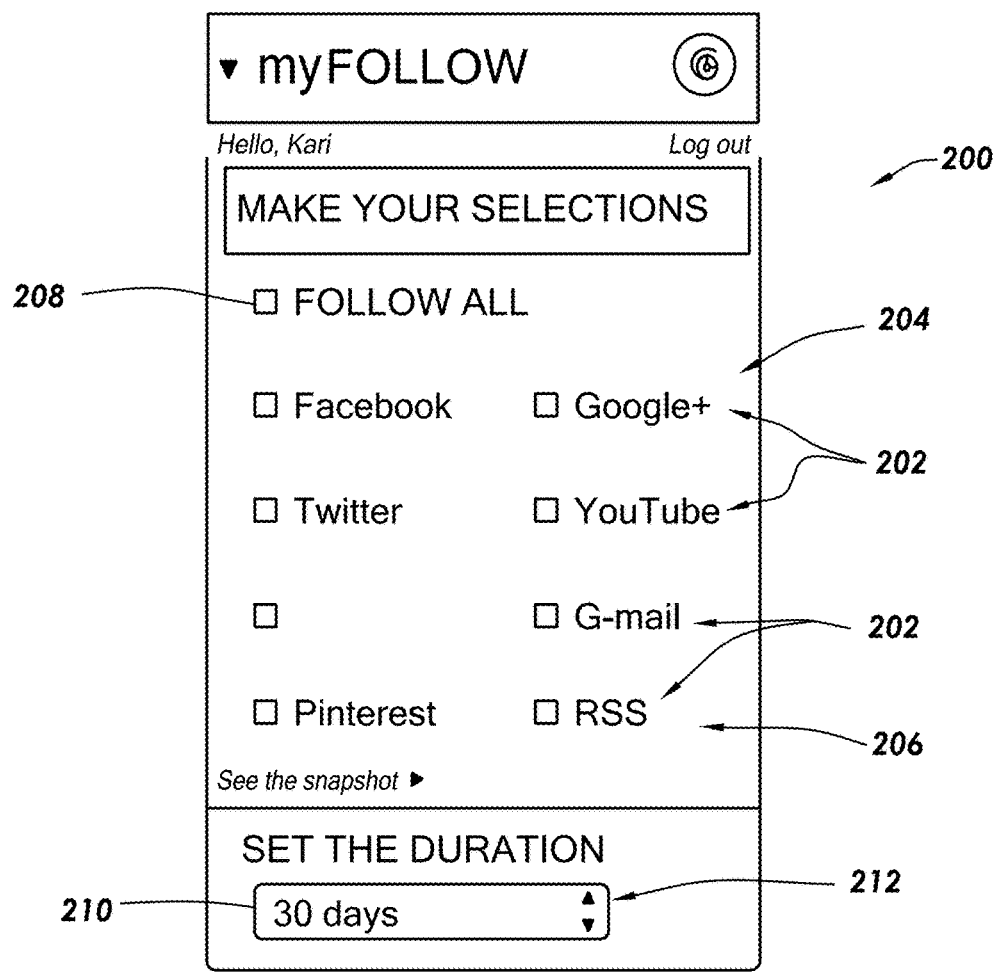
FIG. 2 is an exemplary UI display, generally designated 200, allowing a user to access program features according to an embodiment of the disclosure.

FIG. 2 is an exemplary UI display, generally designated 200, allowing a user to access program features according to an embodiment of the disclosure. The program allows a user to view and indicate various selections or actions 202 by pop-up window, drop-down menu, check list, or other display 204 as is known in the art. For example, in FIG. 2, the consumer sees, in a single view 206, all or a subset of social networking subscriptions available or to which they subscribe. Thus the consumer can indicate that previously or later selected preferences and actions are to apply to each of the selected social network services. Included is a feature to "select all" 208 such subscriptions. Also in FIG. 2 is a rolling menu 210 or other mechanism to select a duration 212 for which the selections or preferences is to last.

The disclosed program allows a user to manage their subscriptions, platforms, preferences, etc., all "in one place."

Figure 3:
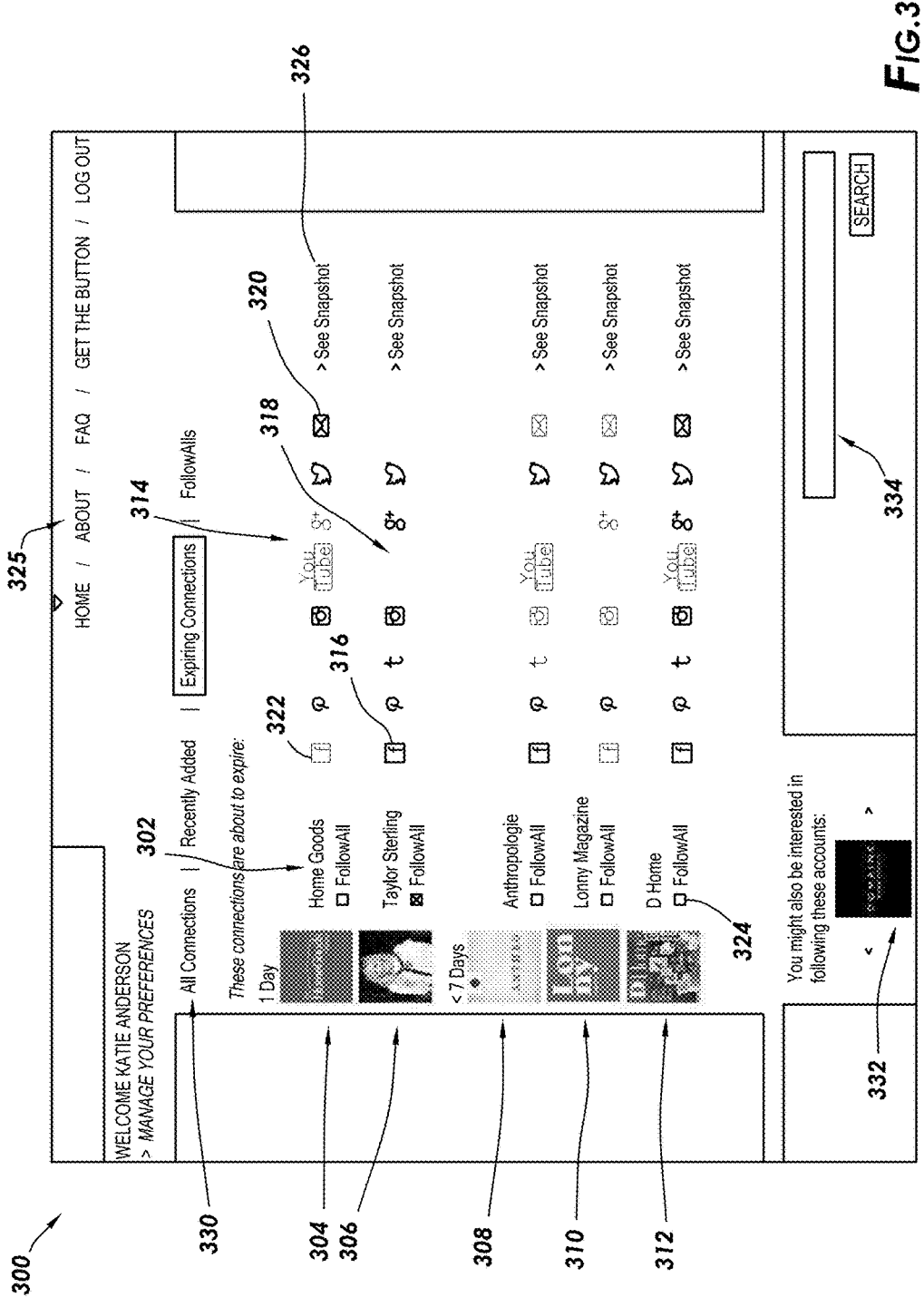
FIG. 3 is an exemplary UI display, generally designated 300, allowing a user to view and manage their social network subscriptions, or "follows," social network preferences, view "snapshots" or quick views of sample social network streams or data, search social network data by keyword or term, and view suggested social network streams, platforms, or accounts, according to aspects of the disclosure.

FIG. 3 is an exemplary UI display, generally designated 300, allowing a user to view and manage their social network subscriptions, or "follows," social network preferences, view "snapshots" or quick views of sample social network streams or data, search social network data by keyword or term, and view suggested social network streams, platforms, or accounts, according to aspects of the disclosure. Particular embodiments of the disclosure can have some, all, or additional features on one or more screens to ease navigation and selection of actions.

The program allows the user to see all, or a selected subset, of their social networking subscriptions 302 "in one place." In FIG. 3, the user subscriptions 302 include subscriptions to retailers or wholesalers such as Home Goods (trade name) stores 304, Anthropologie (trade name) stores 308, artist websites, such as Taylor Sterling's website 306, and magazines, e-magazines, or other news or information sites or streams, such as Lonny Magazine 310, and D Home (trade name) magazine 312.

For each of the displayed subscriptions 302, corresponding social network platforms 314, are seen and can be selected. The program indicates, by highlight or other indicia, which platforms 314 are currently available for the corresponding subscription 302. For example, the Taylor Sterling website subscription 306 is available on the Facebook (trade name) platform, as indicated by indicia 316, but not on the YouTube (trade name) platform, as indicated by the indicia 318 (here, the absence of a corresponding logo). The available platforms for subscription are preferably automatically updated by the program.

Further, the program preferably indicates, by highlight or other indicia, the platforms 312 by which the user has selected to follow, or connect with, a given subscription 302. For example, indicia, such as a darkened or colored icon, can be displayed indicating the user is actively following a particular subscription (e.g., Home Goods (trade name) stores 304) via certain selected platforms, such as email by corresponding darkened indicia 320, but not via other platforms, such as the Facebook (trade name) platform by corresponding lighter indicia 322. The user can add or remove a platform for following a subscription by user input, such as a mouse click, touchscreen touch, etc. As the user makes such changes, the corresponding indicia are updated to indicate the change. For example, a user can add a platform (e.g., Facebook (trade name)) for following a subscription (e.g., Home Goods (trade name) stores), in which case the Facebook (trade name) icon is shown as darkened.

In a preferred embodiment, the user can, with a single input (e.g., click) such as a "follow all" button, box, or other indicia 324, change all of its subscription platforms to active or inactive. Similarly, the user can subscribe or unsubscribe from one or more of their subscriptions.

Links 325 and the like (e.g., Home, About, FAQ, etc.) can be provided for navigation to additional screens.

The information displayed can be arranged according to user's preference, such as by links 330 allowing a view of all subscriptions or connections, recently added subscriptions, expiring subscriptions, subscriptions for which all available platforms are active, etc. Further subdivisions can be broken out for display, such as, within expiring subscriptions, those expiring within one day, one week, etc.

The program can preferably provide and display "suggested" subscriptions, such as at a suggested subscriptions display 332. Alternately, the suggested subscriptions can be displayed on an additional screen, pop-up window, etc. The suggested subscriptions are selected by the program based on an analytics routine, resident on the user device or a remote server or device, taking into account the user's current subscriptions, past subscriptions, purchases, recent likes or follows, similar subscriptions, similar Providers of subscriptions, similar content, metadata similarities, popularity of subscriptions and Providers, paid-for ad campaigns and the like, etc., as is known in the art.

The program also provides a search feature 334, indicated by a text box and search button or the like as is known in the art. The search itself can be performed by the program resident on the user's device or, more likely, by sending a search request via the internet to an appropriate server or the like to perform a search and return search results to the user's device. Searching programs, routines, databases, and the like are known in the art.

Preferably searches can be performed to identify subscriptions and Producers in a variety of ways, including key word and metadata search (categories, tags, etc.), group search, and physical location search (e.g., using the mobile device's location-based services and the user's mobile device). For example, the program can allow for finding Producers to connect with by key word and metadata searches. A consumer can search for "women's fashion", and the program presents the user with various relevant Producers (i.e. Nordstrom, Gap, InStyle Magazine, etc.). Similarly, a consumer can search for Producers by Group Search. A consumer can, for example, search for "top 50 popular NFL Sportswriters" and the program provides an option to subscribe to one or more identified, relevant Producers. Location based searching can, for example, allow a consumer to view Producers or subscriptions associated with local sites, such as a local shopping mall, physically near their location. Location-based, group, and metadata searches can be used in combination. For example, a consumer visiting San Antonio, Tex. can, upon landing at the airport, use the program on their mobile computer device to find one or more "Best Mexican Restaurants near me." The user can then subscribe to one or more of the search results for a selected duration (e.g., the next 7 days, or while the mobile device is near San Antonio).

Figure 4:
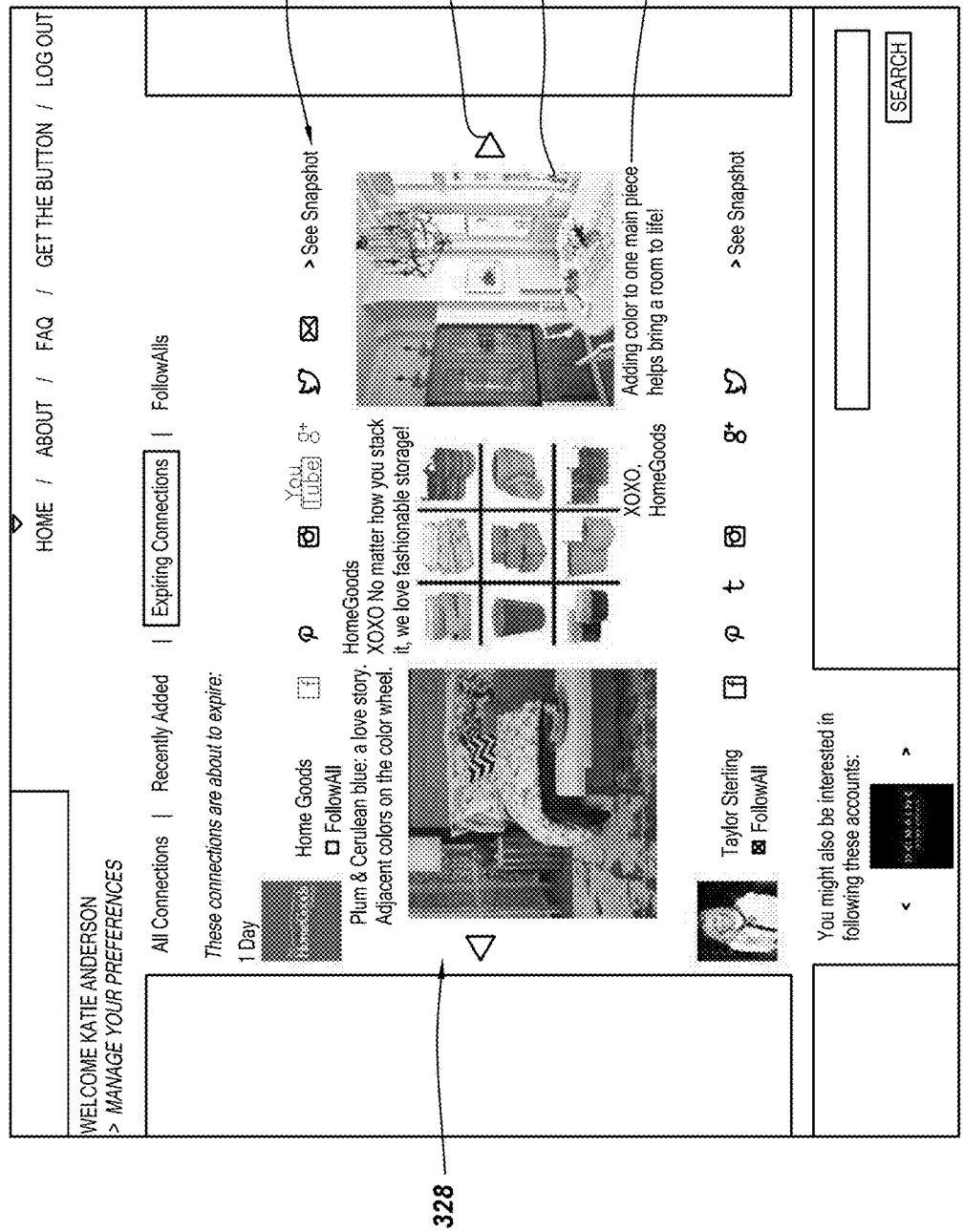
FIG. 4 is an exemplary UI display, generally designated 400, allowing a user to view a data sample 328 or "snapshot" for a selected subscription 302 according to aspects of the disclosure. In a preferred embodiment, the user can, via user input, such as a click on textual indicia 326, view a stream or data sample 328 for a selected subscription.

FIG. 4 is an exemplary UI display, generally designated 400, allowing a user to view a data sample 328 or "snapshot" for a selected subscription 302 according to aspects of the disclosure. In a preferred embodiment, the user can, via user input, such as a click on textual indicia 326, view a stream or data sample 328 for a selected subscription. The illustrated sample 328 is a selectively openable and closeable expanded view 330 with scroll arrows 332, although other mechanisms such as a new screen, pop-up window, and the like can be used as is known in the art. The sample stream or data can include textual data 334, images 336, etc., to provide a user with an example of the type and format of information provided when a subscription 302 is made.

Figure 5:
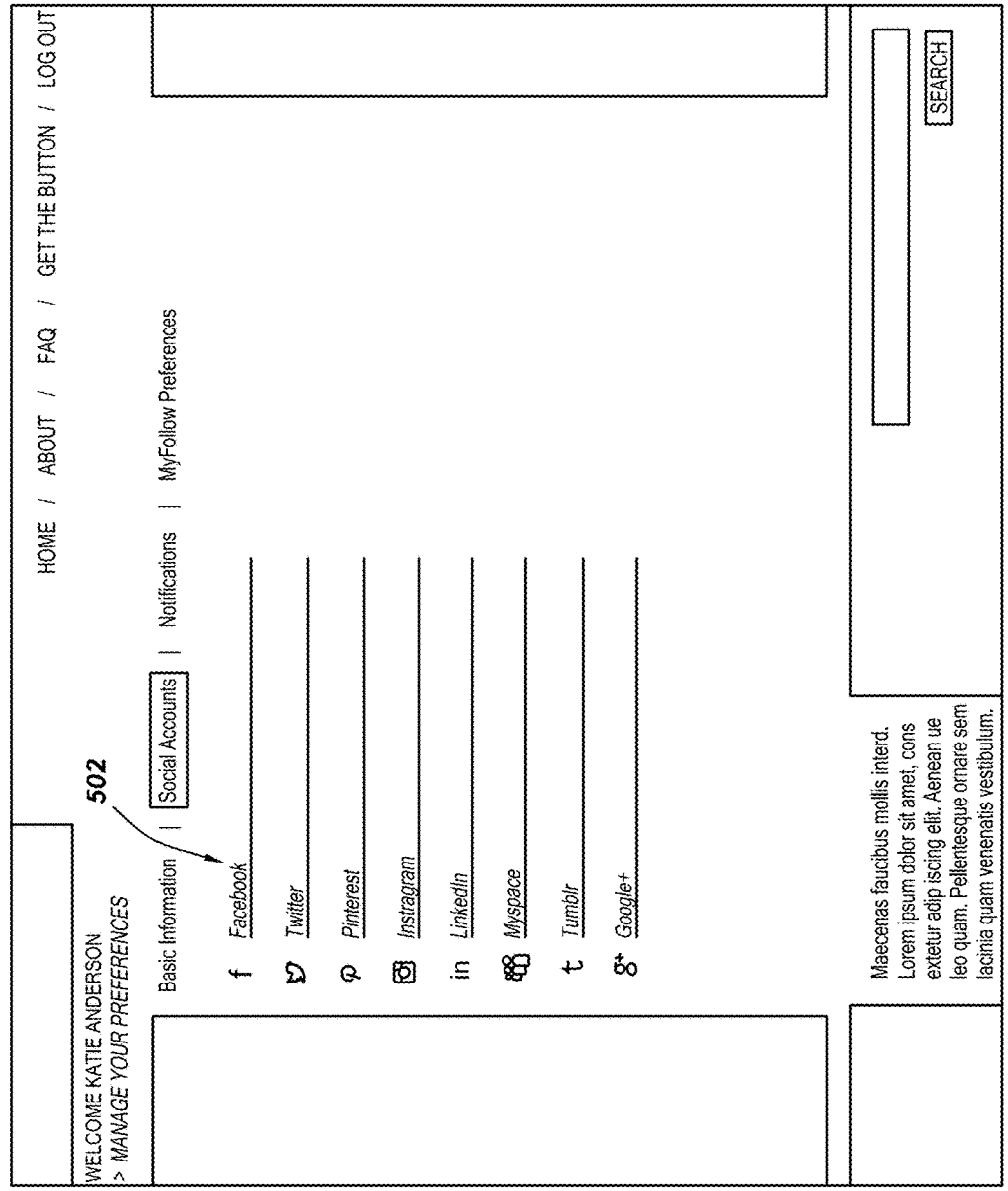
FIG. 5 is an exemplary screen allowing user management of their Social Network platforms or accounts.
Figure 6:
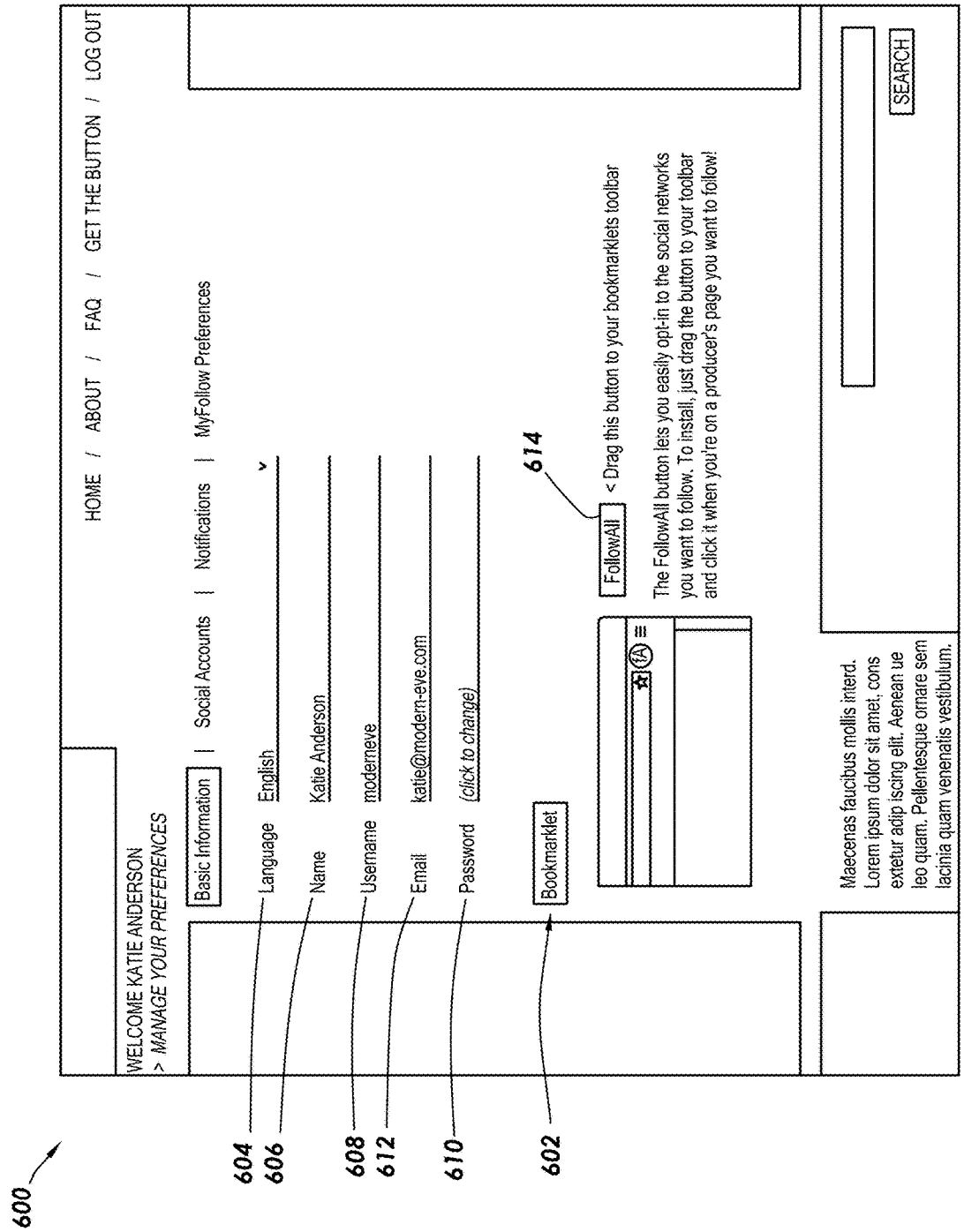
FIG. 6 shows an exemplary Basic Information data entry screen allowing a user to select a preferred language, name, user name, password, email address, and other data.

FIGS. 5 and 6 are exemplary UI displays, generally designated 500 and 600, respectively, allowing a user to manage their preferences for operation of a program and data entry according to aspects of the disclosure. FIG. 5 is an exemplary screen allowing user management of their Social Network platforms 502 or accounts. For each platform, a link is provided enabling the user to view additional data and possible preferences associated with those platforms. Alternately, the links, or other links on other display pages, can provide a direct link to the user's platform account page, platform log-in page, etc. The user can add or remove a platform as desired from the list of platforms managed by the application. Further, the program can offer functionality such that the user can select various options per platform such as duration or times of day (week, etc.) during which subscriptions are allowed to send data streams, set bandwidth limitations, set data size limitations, etc. FIG. 6 shows an exemplary Basic Information data entry screen allowing a user to select a preferred language 604, name 606, user name 608, password 610, email address 612, and other data. Similarly, the program can allow a user to select whether or not to create a bookmark, plug-in, bookmarklet, tool bar, browser button, etc., 602, for the program on one or more browsers (e.g., FireFox (trade name), Google Chrome (trade name), Apple Safari (trade name), Microsoft Internet Explorer (trade name)) used by the user's computer device. In the FIG. 6, a bookmarklet 602 can be created by drag-and-click of the "FollowAll" icon 614, for example. The browser apparatus enables Consumers to quickly follow and un-follow Producers, subscribe and unsubscribe from subscriptions, select following durations, etc., from within their browser application.

The program allows a user to set Notifications, such as sending a text, adding an icon to a task or notification bar, playing an audio sound, etc., upon occurrence of certain events. For example, notifications can be set for expiring subscriptions, receipt of a subscription stream, expiring payment methods, etc. Preferences can be set by the user, such as by a Preferences page. For example, settable preferences can include order of listing or display of subscription listings, setting size, orientation, color, etc., of a desktop icon or widget, selecting a preferred associated web browser, etc.

In one embodiment, the user can, using the program, automatically make changes to multiple platform accounts. For example, to the extent that various platforms require subscription fees or other costs, the user can update, add, or remove credit card or other payment information in the present program, which data is then automatically synched by changing corresponding data at each of the relevant user's platform accounts. Such may require the program to automatically log-in to the various platform accounts as the user, make the requisite changes, and then log-out of the platform accounts. For further disclosure re: automated log-in, log-ins to multiple accounts, etc., see U.S. Patent Application Publication No. 2012/0072494 to Wong, which is incorporated herein by reference for all purposes.

According to an aspect of the disclosure, a "website button" apparatus can be placed on Producers' websites enabling a consumer to click (or otherwise indicate selection) on the button to add that Producer as a subscription in the program. Use and operation of a website button is known in the art and widely deployed for the various platforms mentioned herein.

Figure 7:
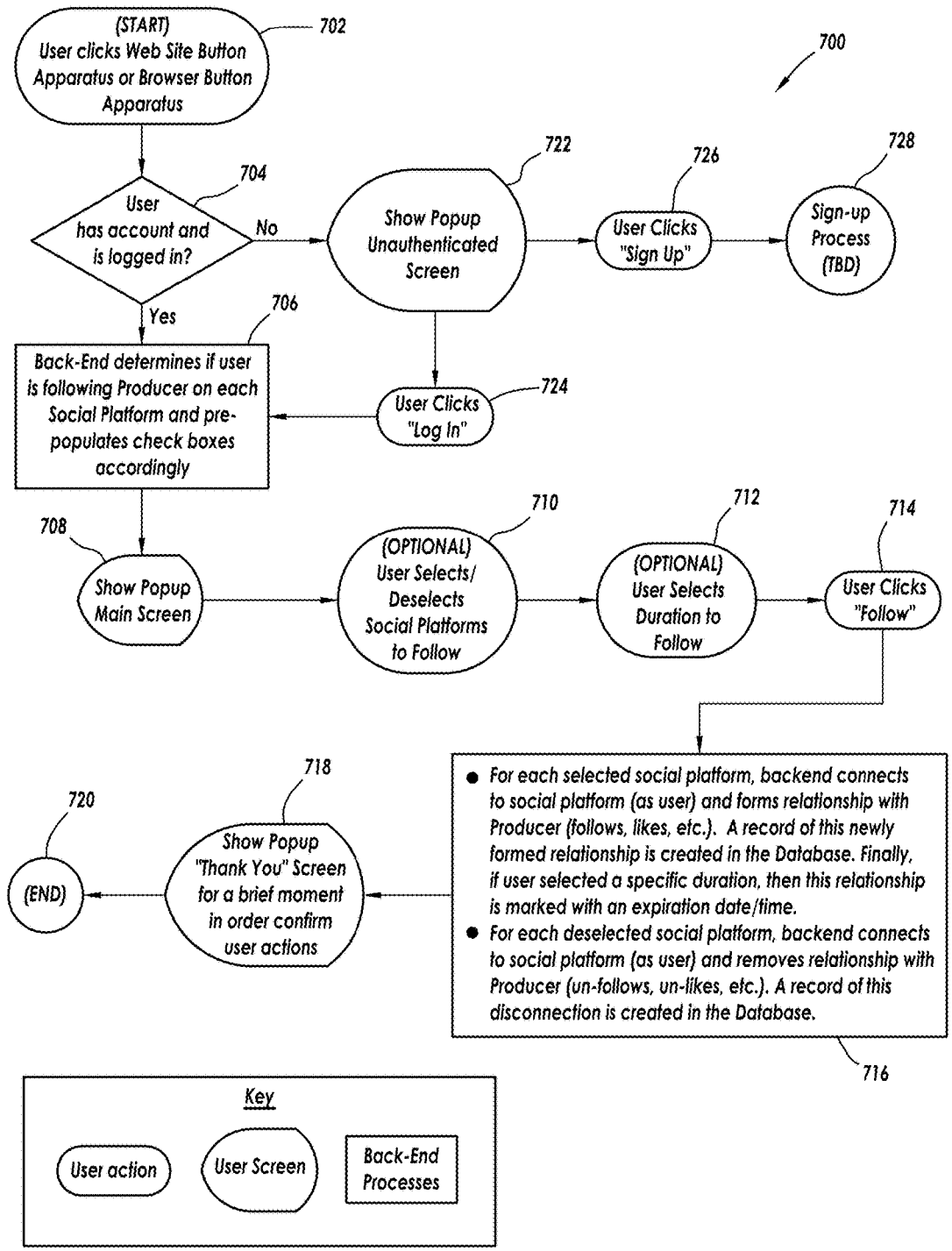
FIG. 7 is a flow chart and wire-frame illustrations, generally designated, of an exemplary method indicating what a user sees when a browser button or website button according to an aspect of the disclosure.

FIG. 7 is a flow chart and wire-frame illustrations, generally designated 700, of an exemplary method indicating what a user sees when a browser button or website button according to an aspect of the disclosure. Similarly, the FIG. 7 indicates the corresponding methods performed during the process. At step 702 the method starts as the user clicks (or otherwise selects) a website button or browser button. At 704, a query is performed at the backend as to whether the user has an account and is logged in. At 706, if the query answer is yes, the back-end determines whether the user is following the indicated Producer on each social platform addressed by the program and populates the indicated check boxes (or other indicia) accordingly. At 708, a pop-up or similar screen is displayed to the user. At 710, the user selects or de-selects the displayed platforms on which to follow the Producer by user input, such as a mouse point-and-click. In one embodiment, re-selected platforms are pre-marked, allowing the user to simply confirm the selections so indicated. At 712, the user can optionally select a duration of time to follow the Producer. Alternately, other or additional features can appear in the display allowing convenient use of other program features discussed herein. The user then selects "follow" or similar to indicate their desire to subscribe to the indicated Producer and on which platforms to follow the Producer, at 714. A closing display can be shown, at 718, indicating successful completion of the process, etc. The method ends at 720.

At 722, if the query answer is "no," an authentication screen is displayed. The user can select to log in at 724 or sign up at 726, in which case the user proceeds through a sign up process 728.

At 716, the back-end automatically connects to each selected platform, as the user, including logging-on as necessary, and performs the necessary platform steps or methods to subscribe to the indicated Producer. For example, the back-end connects with a selected platform's website, server or network; logs-in by submitting log-in data; confirms the same if necessary; navigates the website, server or network to the appropriate "location" and submits the new selection or change (e.g., indicates a "like," or "follow," etc., for that Producer on that platform). A record of the new subscription is added to a corresponding program database. Details of any other selected features (e.g., duration) are also recorded in a corresponding database. Where a platform is de-selected for a Producer, the back-end performs a similar method but alters the platform selections to remove (e.g., un-follow) the Producer from the user's social networking queue. Similarly, the program back-end can, for a pre-existing Producer subscription, confirm the currently selected status. Corresponding records are created in appropriate databases.

For example, a user can indicate to subscribe to a Producer on all platforms with a single click, or select on which platforms to subscribe with a few clicks. The program automatically performs the otherwise time-consuming process of logging onto each platform individually, finding the Producer, and selecting to subscribe (e.g., follow, like). The automated process saves the user time and hassle.

Similarly, for time-based subscriptions, a user can, in one place, choose to follow a Producer (e.g., Toys'R'Us (trade name), Fox (trade name) News Politics) for a selected duration (e.g., two weeks, through the holiday season, during an election month). Upon expiration of the indicated time, the program can either automatically un-subscribe or can prompt the consumer to select whether to continue or cease the subscription.

Current and historical subscription data can also be stored on the program or associated database. A consumer can, on one application, view their current and/or historical subscriptions. For example, a user can see that two years ago they selected to follow Beyoncé on Twitter (trade name), and easily de-select or un-subscribe. Similarly, the user can see a historical subscription to which they are currently not subscribed and, in one place, select to again follow that Producer.

The program also may provide, either resident on the device, on associated servers and databases, or via third-party servers and databases, robust analytics that enable Producers to understand the behavior of targeted consumers and efficiently distribute content to them. More effective and targeted distribution of content means more revenue, better communication and touch-points for Producers and a more enjoyable and relevant experience for consumers.

Figure 8:
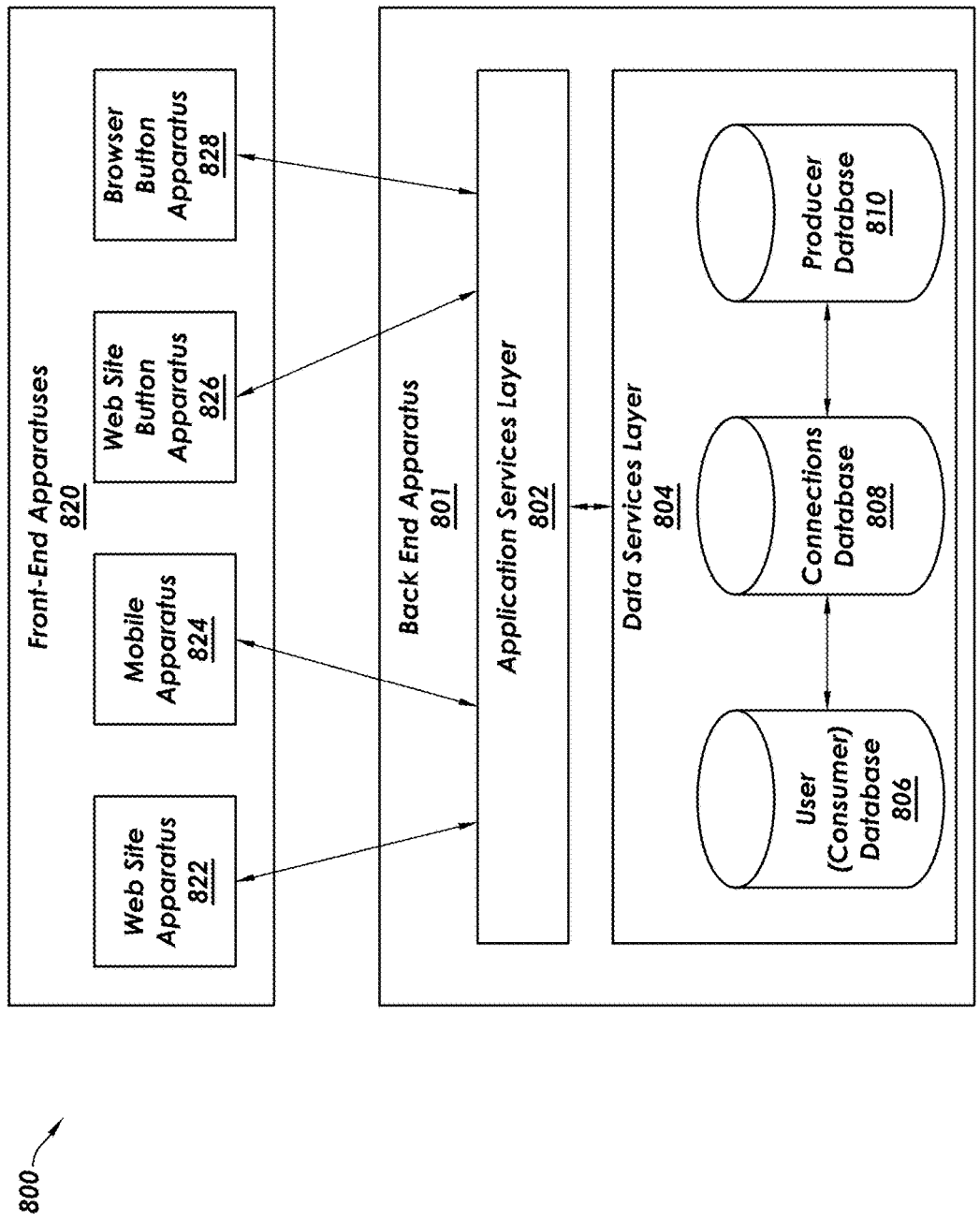
FIG. 8 is an exemplary hardware and software schematic illustrating operation of the methods and apparatus according to an aspect of the disclosure and generally designated.

FIG. 8 is an exemplary hardware and software schematic illustrating operation of the methods and apparatus according to an aspect of the disclosure and generally designated 800. The back-end apparatus 801 is comprised of computer hardware and software (e.g., database servers, web servers, application servers, etc.) that provide cloud-based or internet-based services for operation of the programs and service described herein. The back-end preferably consists of two primary layers: an application services layer 802 and a data services layer 804.

The back-end application services layer 802 is software that is responsible for and operable to perform the steps of: processing communication (requests and responses) between the data service layer and the website apparatus, mobile apparatus, website button apparatus, and browser button apparatus; processing automated program tasks; and operating security tasks such as authentication and authorization.

The back-end apparatus data services layer 804 is comprised of three primary databases: a user database 806, a Producer database 808, and a connections database 810. The combination of these databases working together creates enormous value for both Producers and consumers.

The user database is responsible for storing and maintaining data related to consumers. This includes, but is not limited to: Consumer Account Data (Private information such as, but not limited to, first name, last name, username, password hash, email address, etc.); Consumer Social Accounts Data (Data related to the various Social Platforms the Consumer belongs to and has connected to); Consumer Preferences (Application preferences chosen by the consumer); Consumer Metadata (Non-personally-identifiable information about the Consumer, such as, but not limited to: age, sex, interests, city, favorite color, etc.)

The Producer Database is responsible for storing and maintaining data related to Consumers. This includes, but is not limited to: Producer Description (Producer name, web site, etc.); Producer Social Presences (including but not limited to data such as Producers' Facebook Page URLs, Producer Twitter handles, etc.); Producer Metadata (including but not limited to keywords, tags, hash tags, categories, industry sector, etc.); Producer Account Data (private information such as but not limited to username, password hash, administrative contact information, etc.); Producer Preferences (Application preferences chosen by the Producer); Producer Reports (Stored analytic reports available to Producers); Producer Ads and Campaigns (Information related to Producer Ads and Campaigns). Some of these categories of Producer data can be collected and accessed only upon a Producer subscribing to or creating an account on the disclosed program or with its owners.

The Connections Database is responsible for storing and maintaining data related to Subscriptions between Consumers and Producers. This includes, but is not limited to: Current Subscriptions (every time a Consumer subscribes to a Producer, whether directly on a Social Platform, or using the methods described herein, a record of the subscription is stored in the database, along with timestamp, source, and other related data); Historical or Expired subscriptions (every time a consumer un-subscribes from a Producer, whether directly on a Social Platform, or using the methods described herein, a record of the connection is stored in this database, along with timestamp, source, and other related data).

Producers or others can create or access the analytic reports based on the data described above. This data is valuable because it provides robust, relational metrics on how consumers behave, what content they are interested in, what types of Producers they subscribe to, etc. This data is not available to Producers now to the extent possible using the herein described methods and apparatus. Producers (or others) can perform analytic queries such as the following: How many women in Texas between the ages of 20 and 35 connected with Nordstrom during between Aug. 1, 2013 and Jan. 15, 2014? How many un-subscribes did Producers in the "Political" category suffer after the presidential election? What industry gained the most subscriptions from consumers between the ages of 15 and 23? What are the demographics of those on Facebook who "like" Nike tennis v. Nike football? What time of the day do women ages 25-35 typically interact with the various Tori Burch Platforms?

Producers are able to interface with, and leverage the features of, the disclosed methods and apparatus through various means. The website apparatus enables Producers to take advantage of features such as: Downloading the website button HTML code to embed on their websites; managing preferences and account information; manage descriptions; managing metadata; managing Social platform presences (i.e., Facebook page URL, Twitter handle, etc.); managing ads and campaigns; creating analytic reports.

The front-end apparatus 820 are exemplary and can be used in various combinations. Front-end apparatus include websites 822, user computer devices 824, and website and browser "buttons" or other mechanisms, 826 and 828, resident on the user of Producer devices.

Currently Consumers receive all of the Content created by Producers that they follow (much of which Consumers tune out because not all of the Content is relevant to their individual interests). The disclosed methods and apparatus vastly improves upon this Consumer experience by allowing Consumers to easily select and customize the type of Content they receive, across multiple Platforms, from multiple Producers, based on topics, key terms, or other metadata (such as "men's shoes," or "ladies' bags at Nordstrom's," etc.). By allowing Consumers to selectively choose the Content they receive, the value of Producers' social media efforts is increased.

The disclosed methods and apparatus do not function like a traditional Social Platform. For example, the disclosed program does not store Producer content (excluding temporary storage or cache functions, etc.). Similarly, the disclosed methods and apparatus do not provide for creation of content. Other tools for creating content exist and are well known. Finally, in a preferred embodiment, the disclosed methods and apparatus do not aggregate content and are not platforms for the consumption of content. Consumers are encouraged to consume content using whatever Platforms, devices, etc., they choose. The methods and apparatus herein are designed to allow easy selection and management of content to be delivered.

According to one embodiment, the disclosed methods and apparatus are performed on a Service Provider Network which provides the social networking management services described herein. Such a service network includes the application layer and data services layer described above, as well as, the back-end apparatus.

The Service Provider Network is in communication via the internet (and/or cellular network) with user devices or networks, and Producer devices or networks, and potentially with data analytics devices and networks. Such communication is typically performed using a combination of software and hardware, and can be located on various equipment and at various network levels.

Data acquisition APIs or services can be employed to enable one-way communication of data, such as for "stripping" or "mining" data from public or private websites or networks to populate data at a Service Provider Network. For example, data acquisition can be used to determine which platforms a Producer utilizes, etc.

The Service Provider Network can further include desktop and laptop computers, smart mobile devices, servers (virtual or real), databases, ESB (enterprise bus servers), routers, back-up power, wiring, wireless equipment, redundant systems, etc., such as are known in the art and are apparent to those of skill in the art. The Service Provider Network components need not be located at the same physical location but are operably connected (e.g., via the internet, network, etc.). The software for performing the services can be resident on one or more local computers (e.g., servers, etc.) or one or more remote computers (e.g., servers, hosted servers, etc.). For example, data storage and processing services can occur remotely to the service provider, in the cloud, on the internet, at a dedicated host server, under the control or management of a third-party contracted for that purpose.

The databases can be servers, virtual servers, relational database management systems, hardware clusters, hard drives, etc. Data services can include one or more applications for data processing, querying, and manipulation. For example, a Structured Query Language (SQL) or the commercially available APACHE (trade name) HADOOP (trade name) can be used. Data storage and data services can be located or performed on-site or remotely via the internet and allow the Service Provider or others to access, manage, upload and download data, and query the databases and data services as needed. Other data storage, management, processing, and analytics products and types will be apparent to those of skill in the art.

The data services allow a Service Provider or customer to input queries, receive corresponding data, and in some embodiments run algorithms. The data services communicate a query to database software, whether local or remote, translate the query protocols if necessary to allow an effective interface, receive the resulting queried data, and present it to the inquirer. The retrieved data can be stored for later use by the inquirer. Other query examples are discussed above herein.

The services can be provided using applications resident on a customer device (e.g., desktop computer, server, etc.), resident on a provider device, or resident on a remote device (e.g., in the cloud, etc.). The services can be provided as Software as a Service, as explained elsewhere herein, and/or related services such as Infrastructure as a Service, Platform as a Service, unified communications as a service, etc.

The system, methods, services, processes, and other embodiments according to the present disclosure include computerized systems requiring the performance of one or more methods or steps performed on or in association with one or more computer. (A computer or a computerized system is not to be considered or treated as a means-plus-function element as used herein.)

A computer is a programmable machine having two principal characteristics, namely, it responds to a set of instructions in a well-defined manner and can execute a pre-recorded list of instructions (e.g., a program). A computer according to the present disclosure is a device with a processor and a memory. For purposes of this disclosure, a computer is defined to include servers, personal computers, (i.e., desktop computers, laptop computers, netbooks, tablets), "smart" mobile communications device (e.g., smart phones), and devices providing functionality through internal components or connection to an external component (e.g., computer, server, or global communications network (such as the internet)) to take direction from or engage in processes which are then delivered to other system components.

Those of skill in the art recognize that other devices, alone or in conjunction with an architecture associated with a system, can provide a computerized environment for carrying out the methods disclosed herein. The method and process aspects of the disclosure are computer-implemented and, more particularly, at least one step is carried out using a computer.

General-purpose computers include hardware components. A memory or memory device enables a computer to store data and programs. Common storage devices include disk drives, tape drives, thumb drives, and others known in the art. An input device can be a keyboard, mouse, hand-held controller, remote controller, a touchscreen, and other input devices known in the art. The input device is the conduit through which data and instructions enter a computer. An output device is a display screen, printer, or other device letting the user sense what the computer has accomplished, is accomplishing, or is expected to accomplish. A central processing unit (CPU) is the "brains" of the computer and executes instructions and performs calculations. For example, typical components of a CPU are an arithmetic logic unit (ALU), which performs arithmetic and logical operations and a control unit (CU) which extracts instructions from memory, decodes and executes them, calling on the ALU when necessary. The CPU can be a micro-processor, processor, one or more printed circuit boards (PCBs). In addition to these components, others make it possible for computer components to work together or in conjunction with external devices and systems, for example, a bus to transmit data within the computer, ports for connectivity to external devices or data transmission systems (such as the internet), wireless transmitters, read and read-write devices, etc., such as are known in the art.

A server is a computer or device on a network that manages network resources. There are many different types of servers, including remote, live and network access servers, data servers, member servers, staging servers, etc. A server can be hardware and/or software that manages access to a centralized resource or service in a network. For purposes of this disclosure, the term "server" also includes "virtual servers" which can be hosted on actual servers.

A computerized or data network is a communications network allowing computers to exchange data, with networked devices passing data to each other on data connections. Network devices that originate, route, and terminate data are called nodes. The connections (links) between nodes are established using wire or wireless media. Nodes can include hosts, such as PCs, phones, servers, and networking hardware. Devices are networked together when one device is able to exchange information with the other device whether or not they have a direct connection to each other. Computer networks support applications such as access to the World Wide Web (WWW) or internet, shared use of application and storage servers, printers, and use of email and instant messaging applications. Computer networks can differ in the physical media used to transmit signals, protocols to organize network traffic, size, topology, and organizational intent. The network can include routers, databases, wired or wireless connectivity, user interfaces, override controls, etc. The network provides connectivity to multiple pieces of equipment pulling or capable of pulling an electric load. A network provides connectivity to the internet, and through the internet (or directly) to a provider network, networks, server, or servers. A provider network can include servers (actual or virtual), and other hardware and software, as well as other network devices. The remote provider network stores and manages content, such as software programs for controlling one or more remote private networks. The control content made available by the provider allows monitoring, control, messaging, use-management software or data, interface or protocol software, software or data for synchronization, and other services to, from, or for one or more independent networks.

Database

The disclosure includes one or more databases (memory devices, memories, hard-drives, etc.) for storing information relating to aspects of the disclosure. The information stored on a database can, for example, be related to a private subscriber, a content provider, a host, a security provider, etc. One of ordinary skill in the art appreciates that "a database" can be a plurality of databases, each of which can be linked to one another, accessible by a user via a user interface, stored on a computer readable medium or a memory of a computer (e.g., PC, server, etc.), and accessed by users via global communications networks (e.g., the internet) which may be linked using satellites, wired technologies, or wireless technologies.

In exemplary embodiments of the disclosure, a computerized system includes a computer, a memory or database, a computer program or application, a network, a user interface, and communications components to operably connect these (e.g., wires, wireless transmitters and receivers, etc.). The computer program is stored in one or more memory or database and executed by one or more computer. A user interface provides a user, whether the service provider or a consumer, with a visual display of program data and, in conjunction with one or more input device, a mechanism for communicating with the program, memory, etc., of the system. Communication between the service provider and consumer is via the internet or cellular network, for example. Parts or all of the various programs, databases, data, and connectivity elements can reside in or be split among separate computers and memory storages. One or more computers execute the one or more computer programs, applications, or services, and communicate via network to one or more databases or other computers.

In computer networking, "cloud computing" is used to describe a variety of concepts involving a large number of computers connected through a network (e.g., the Internet). The phrase is often used in reference to network-based services, which appear to be provided by real server hardware, but which are in fact served by virtual hardware, simulated by software running on one or more machines. Virtual servers do not physically exist and can therefore be moved around, scaled up or down, etc., without affecting the user.

In common usage, "the cloud" is essentially a metaphor for the internet. "In the cloud" also refers to software, platforms, and infrastructure sold "as a service" (i.e., remotely through the internet). The supplier has actual servers which host products and services from a remote location, so that individual users do not require servers of their own. End-users can simply log-on to the network, often without installing anything, and access software, platforms, etc. Models of cloud computing service are known as software as a service, platform as a service, and infrastructure as a service. Cloud services may be offered in a public, private, or hybrid networks. Google, Amazon, Oracle Cloud, and Microsoft Azure are well-known cloud vendors.

Software as a service (SaaS) is a software delivery model in which software and associated data are centrally hosted on the Cloud. Under SaaS, a software provider licenses a software application to clients for use as a service on demand, e.g., through a subscription, time subscription, etc. SaaS allows the provider to develop, host, and operate a software application for use by clients who just need a computer with internet access to download and run the software application and/or to access a host to run the software application. The software application can be licensed to a single user or a group of users, and each user may have many clients and/or client sessions.

Typically, SaaS systems are hosted in datacenters whose infrastructure provides a set of resources and application services to a set of multiple tenants. A "tenant" can refer to a distinct user or group of users having a service contract with the provider to support a specific service. Most SaaS solutions use a multi-tenant architecture where a single version of the application, having a single configuration (i.e., hardware, operating system, and network) is used by all tenants (customers). The application can be scaled by installation on several machines. Other solutions can be used, such as virtualization, to manage large numbers of customers. SaaS supports customization in that the application provides defined configuration options allowing each customer to alter their configuration parameters and options to choose functionality and "look and feel."

SaaS services are supplied by independent software vendors (ISVs) or Application Service Providers (ASPs). SaaS is a common delivery model for business applications (e.g., office and messaging, management, and development software, and for accounting, collaboration, management information systems (MIS), invoicing, and content management.

SaaS is an advantage to end-users in that they do not need to provide hardware and software to store, back-up, manage, update, and execute the provided software. Since SaaS applications cannot access the user's private systems (databases), they often offer integration protocols and application programming interfaces (API) such as http (hypertext transfer protocol), REST (representational state transfer), SOAP (simple object access protocol), and JSON (JavaScript Object Notation).

The disclosure is provided in support of any methods claimed or which may be later claimed. Specifically, support is provided to meet the technical, procedural, or substantive requirements of certain examining offices. It is expressly understood that the portions or actions of the methods can be performed in any order, unless specified or otherwise necessary, that each portion of the method can be repeated, performed in orders other than those presented, that additional actions can be performed between the enumerated actions, and that, unless stated otherwise, actions can be omitted or moved. Those of skill in the art will recognize the various possible combinations and permutations of actions performable in the methods disclosed herein without an explicit listing of every possible such combination or permutation. It is explicitly disclosed and understood that the actions disclosed can be performed in any order (xyz, xzy, yxz, yzx, etc.) without the wasteful and tedious inclusion of writing out every such order. Further, it is understood that listed actions can be repeated, in various order, in disclosed embodiments (e.g., xxyz, xyxyz, etc.), omitted in some embodiments (e.g., xz, yz, etc.), and can have unlisted actions between listed actions (e.g., xyza, xayz, axyz, etc.).

The following references are incorporated herein by reference in their entirety for all purposes: U.S. Pat. No. 8,918,517 to Meijer; U.S. Publication No. 2010/0199340 to Jonas, U.S. Publication No. 2012/0084841 to Whitmyer, Jr., U.S. Publication No. 2014/0337436 to Hoagland.

Conclusion

The words or terms used herein have their plain, ordinary meaning in the field of this disclosure, except to the extent explicitly and clearly defined in this disclosure or unless the specific context otherwise requires a different meaning. The words "comprising," "containing," "including," "having," and all grammatical variations thereof are intended to have an open, non-limiting meaning. For example, an apparatus comprising a part does not exclude it from having additional parts and a method having a step does not exclude it having additional steps. The indefinite articles "a" or "an" mean one or more than one of the component, part, or step that the article introduces. The terms "and," "or," and "and/or" shall be read in the least restrictive sense possible. Each numerical value should be read once as modified by the term "about" (unless already expressly so modified), and then read again as not so modified, unless otherwise indicated in context.

The embodiments disclosed are illustrative only, as the disclosure can be modified and practiced in different but equivalent manners apparent to those skilled in the art having the benefit of the teachings herein. Those of ordinary skill will understand variations, combinations, and equivalents of the specific embodiments, methods, and examples herein. The invention should therefore not be limited by the above described embodiments, methods, and examples. The invention is limited by the appended claims.

We claim:

1. A method of managing a consumer's social media subscriptions using a computer device to execute a non-transitory social media management program stored in a memory on the device, the method comprising:
    displaying on a user interface of a user computer device, the user computer device having a plurality of non-transitory, social networking platform programs stored in a memory thereof and executable thereon to communicate with and receive social media content from a plurality of corresponding social networking platform servers, and wherein each of the plurality of social networking platform programs having associated therewith a plurality of user-selected social media subscriptions to receive social media content from a content producer via the social networking platform programs, a plurality of social media subscription indicia corresponding to the plurality of user-selected subscriptions, and for each subscription indicia, displaying on the user interface a plurality of social networking platform indicia corresponding to the social networking platform programs on the user computer device;
    receiving user selections of the displayed social media subscriptions and the displayed social networking platform indicia; and
    in response to a user selection, using the program, automatically communicating, via the internet, between the user computer device and a social networking platform server corresponding to the selected social networking platform indicia to change a subscription option at the social networking platform server.

2. The method of claim 1, further comprising receiving a first user selection indicating to unsubscribe from a first subscription of the plurality of social media subscriptions; and
    further comprising, in response to the first user selection, using the program, automatically communicating, via the interact, between the user computer device and at least two of the plurality of social networking platform servers to change a subscription option at the platform server to unsubscribe from the first subscription.

3. The method of claim 1, further comprising receiving a first user selection indicating to unsubscribe from a first social networking platform corresponding to a first subscription; and
    further comprising, in response to the first user selection, using the program, automatically communicating, via the internet, between the user computer device and a social networking platform server corresponding to the first social networking platform to change a subscription option at the first social networking platform server to unsubscribe from the first social networking platform.

4. The method of claim 1, wherein the user selections indicate a change to be made to a subscription option at one or more social networking platform servers, the subscription option taken from the following set of options: subscribing to or unsubscribing from a subscription on a selected social networking platform; subscribing to or unsubscribing from a subscription on all of the plurality of social networking platforms; changing a subscription to active or inactive; changing a social networking platform to active or inactive; selecting a duration for which the change in subscription option is to last; selecting a data size limitation; and selecting an email address to associate with a social networking platform account.

5. The method of claim 1, wherein the step of automatically communicating, via the internet, between the user computer device and the social networking platform servers includes automatic communication of a user selection between the user computer device and a back-end server having a user database for storing and maintaining user Account Data and user Social Accounts Data.

6. The method of claim 5, wherein the step of automatically communicating further includes automatic communication between the back-end server and the social networking platform servers corresponding to the selected social networking platform indicia to change a subscription option at the social networking platform server.

7. The method of claim 1, further comprising indicating on the user interface, for a first subscription indicia, which of the plurality of social networking platform programs are currently available for the first subscription.

8. The method of claim 7, further comprising automatically updating the indicated social networking platforms programs available for the first subscription in response to communication from a back-end server performing data acquisition services via the internet.

9. The method of claim 1, further comprising indicating on the user interface previous user selections regarding social networking platform indicia and subscription indicia.

10. The method of claim 1, further comprising displaying in the user interface a suggested social media subscription based on a historical record of user-selected social media subscriptions.

11. The method of claim 1, further comprising displaying in the user interface a search input field and, in response to user input of search data, communicating the search data to a back-end server to perform a search and return results to the user computer device.

12. The method of claim 1, further comprising displaying on the user interface a plurality of links associated with the plurality of displayed social networking platform indicia, the plurality of links enabling the user to view additional data or preferences associated with the plurality of social networking platform programs or linking directly to a user account page associated with the social networking platform program.

13. The method of claim 1, further comprising displaying on the user interface a plurality of content producer indicia corresponding to a plurality of content producer subscriptions available directly from the content producers;
- displaying on the user interface, for each content producer indicia, communication method indicia corresponding to communication methods for receiving the content producer subscription, the communication method indicia indicating at least one of the following communication methods: short messaging service (SMS), multimedia messaging service (MMS), instant messaging (IM), and email;
- receiving user selections of displayed communication method indicia; and
- in response to the user selections, using the program, automatically communicating, via the internet, between the user computer device and a content producer server corresponding to the user selected communication method indicia to change a subscription option.

* * * * *